United States Patent
Mochida et al.

(10) Patent No.: US 12,464,181 B2
(45) Date of Patent: Nov. 4, 2025

(54) VIDEO TRANSMISSION DEVICE, VIDEO RECEPTION DEVICE, VIDEO TRANSMISSION METHOD, STRAGE MEDIUM OF VIDEO TRANSMISSION PROGRAM, AND STRAGE MEDIUM OF VIDEO RECEPTION PROGRAM

(71) Applicant: NTT, Inc., Tokyo (JP)

(72) Inventors: Yasuhiro Mochida, Musashino (JP); Daisuke Shirai, Musashino (JP); Takuro Yamaguchi, Musashino (JP)

(73) Assignee: NTT, Inc., Tokyo (JP)

(*) Notice: Subject to any disclaimer, the term of this patent is extended or adjusted under 35 U.S.C. 154(b) by 0 days.

(21) Appl. No.: 18/682,033

(22) PCT Filed: Aug. 18, 2021

(86) PCT No.: PCT/JP2021/030132
§ 371 (c)(1),
(2) Date: Feb. 7, 2024

(87) PCT Pub. No.: WO2023/021595
PCT Pub. Date: Feb. 23, 2023

(65) Prior Publication Data
US 2025/0126314 A1    Apr. 17, 2025

(51) Int. Cl.
*H04N 21/2662* (2011.01)
*H04N 21/462* (2011.01)

(52) U.S. Cl.
CPC ..... *H04N 21/2662* (2013.01); *H04N 21/4621* (2013.01)

(58) Field of Classification Search
CPC ............... H04N 21/2662; H04N 21/4621
See application file for complete search history.

(56) References Cited

U.S. PATENT DOCUMENTS

| | | | |
|---|---|---|---|
| 2012/0102132 A1 | 4/2012 | Lee | |
| 2014/0089990 A1* | 3/2014 | van Deventer | H04N 21/2356 725/115 |
| 2017/0149535 A1* | 5/2017 | Panattu | H04L 43/0829 |
| 2018/0367465 A1* | 12/2018 | Levi | H04N 21/2381 |

FOREIGN PATENT DOCUMENTS

| | | |
|---|---|---|
| JP | 5368895 B2 | 9/2013 |
| JP | 2013-211897 | 10/2013 |
| JP | 2020145584 A | 9/2020 |

OTHER PUBLICATIONS

[No Author Listed], "Generation and Alignment of Interface Signals to the SMPTE Epoch," SMPTE Standard, SMPTE ST 2059-1:2015, Mar. 2015, 31 pages.

(Continued)

*Primary Examiner* — Randy A Flynn
(74) *Attorney, Agent, or Firm* — Fish & Richardson P.C.

(57) ABSTRACT

A video transmission device 11 includes a plurality of transmission units 112 that each convert into IP packets in parallel each video data with a low frame rate obtained by dividing video data with a high frame rate through allocation in units of video frames in temporally preceding order and transmit the IP packets.

8 Claims, 10 Drawing Sheets (56) References Cited

OTHER PUBLICATIONS

[No Author Listed], "Professional Media Over Managed IP Networks: Uncompressed Active Video," SMPTE Standard, SMPTE ST 2110-20:2017, Sep. 2017, 22 pages.

[No Author Listed], "Seamless Protection Switching of RTP Datagrams," SMPTE Standard, SMPTE ST 2022-7:2019 Revision of ST 2022-7:2013, Dec. 2018, 11 pages.

[No Author Listed], "Single Video Essence Transport over Multiple ST 2110-20 Streams," SMPTE Recommended Practice, SMPTE RP 2110-23:2019, Dec. 2019, 27 pages.

Cronk et al., "Simplifying Super-Slo Workflow," IP Showcase Theatre at IBC, Amsterdam, NL, Sep. 14-18, 2018, 12 pages.

\* cited by examiner

| Phase NUMBER/LINK NAME | PACKET LOSS RATE |
|---|---|
| phase1 LINK A | 1% |
| phase1 LINK B | 0% |
| phase1 LINK C | 0.1% |
| phase1 LINK D | 0% |
| phase2 LINK A | 0.5% |
| phase2 LINK B | 0% |
| phase2 LINK C | 0% |
| phase2 LINK D | 0% |

VIDEO TRANSMISSION DEVICE, VIDEO RECEPTION DEVICE, VIDEO TRANSMISSION METHOD, STRAGE MEDIUM OF VIDEO TRANSMISSION PROGRAM, AND STRAGE MEDIUM OF VIDEO RECEPTION PROGRAM

CROSS-REFERENCE TO RELATED APPLICATIONS

This application is a National Stage application under 35 U.S.C. § 371 of International Application No. PCT/JP2021/030132, having an International Filing Date of Aug. 18, 2021. The disclosure of the prior application is considered part of the disclosure of this application, and is incorporated by reference in its entirety into this application.

TECHNICAL FIELD

The present invention relates to a video transmission device, a video reception device, a video transmission method, a video reception method, a video transmission program, and a video reception program.

BACKGROUND ART

Conventionally, there is known a video transmission device that converts video data input via a serial digital interface (SDI) into an IP flow and transmits the IP flow. A video reception device that receives an IP flow and converts video data into SDI is known.

The video transmission device can store video data in real-time transport protocol (RTP) packets and transmit the data using IP packets (Non Patent Literature 1). In a case where the video data of the SDI signal input to the SDI is converted into RTP packets and transmitted, the RTP time stamps applied to each of the RTP packets storing the video data extracted from the same video frame are all the same. A clock frequency F of the RTP time stamp in the RTP packet of the video is $F=9.0\times10^4$.

In addition, the video transmission device and the video reception device can operate by synchronizing the time with the International Atomic Time (TAI) using a precision time protocol (PTP) or the like. The origin of the clock counter is 00:00:00 TAI on Jan. 1, 1970 (Non Patent Literature 2). By this mechanism, the video transmission device and the video reception device hold a synchronized clock counter.

Further, the video transmission device and the video reception device can execute seamless protection for protecting video data transmitted in IP packets from packet loss using fully redundant transmission (Non Patent Literature 3). For example, the video transmission device duplicates an RTP packet and transmits the duplicated RTP packets over two IP flows (two paths). The video reception device receives two IP flows at all times and integrates RTP packets acquired from the respective IP flows. Thus, video data not missing anything can be output unless packet loss occurs at the same place at the same time.

Here, attention is paid to the video data.

In the case of ultra high definition (UHD) video data, standard frame rates are 50 frames per second (FPS), 59.94 FPS, 60 FPS, and the like. In the case of expressing a fast moving scene, a high frame rate such as 120 FPS is suitable. Thereafter, the high frame rate $f_H$ is set to N times (N is a natural number of 2 or more) the standard frame rate $f_S$.

In addition, the video data with the high frame rate is divided into multiple pieces of video data with a standard frame rate and mapped to a plurality of synchronized SDI signals, which can be used as an input/output interface for the video data with the high frame rate. At this time, the video data with the high frame rate is allocated to multiple pieces of video data with the standard frame rate in temporally preceding order in units of video frames.

The division of the video data with the high frame rate into a plurality of pieces of video data with the standard frame rate in this manner is called phase division. The phase numbers are labeled sequentially as shown by the phase 1, 2, . . . , N for the pieces of video data with the standard frame rate after the phase division.

For example, the 4K/120 FPS video data is divided into two lines of 4K/60 FPS video data of a phase 1 and 4K/60 FPS video data of a phase 2. Since the 4K/60 FPS video data can be input/output via one 12G-SDI line, 4K/120 FPS video data can be input/output via two synchronized 12G-SDI lines.

Similarly, the 8K/120 FPS video data is divided into two lines of 8K/60 FPS video data of a phase 1 and 8K/60 FPS video data of a phase 2. Since the 8K/60 FPS video data can be input/output via four 12G-SDI lines (one set of 12G-SDI quad links), the 8K/120 FPS video can be input/output via synchronized two sets of 12G-SDI quad links.

Further, the SDI is parallelized to be used as an input interface of video data with a high frame rate. For example, in the video transmission device, one input unit takes out 4K/60 FPS video data from each 12G-SDI and alternately passes the video frame (4K/60 FPS video data) of the phase 1 and the video frame (4K/60 FPS video data) of the phase 2 to one transmission unit.

The transmission unit sequentially stores the video data passed from the input unit in RTP packets, and transmits 4K/120 FPS video data as one IP flow. Since the RTP time stamp increases by $F/f_H$ for each video frame, in the case of 4K/120 FPS video data, $F=9.0\times10^4$, $f_H=120$, and the increase width becomes 750.

CITATION LIST

Non Patent Literature

[Non Patent Literature 1] SMPTE ST2110-20, "Professional Media Over Managed IP Networks: Uncompressed Active Video," 2017
[Non Patent Literature 2] SMPTE ST2059-1, "Generation and Alignment of Interface Signals to the SMPTE Epoch," 2015
[Non Patent Literature 3] SMPTE ST2022-7, "Seamless Protection Switching of RTP Datagrams," 2019
[Non Patent Literature 4] SMPTE RP2110-23, "Single Video Essence Transport over Multiple ST 2110-20 Streams," 2019

SUMMARY OF INVENTION

Technical Problem

However, since a conventional video transmission device converts video data with a high frame rate into IP packets, it is necessary to perform high speed processing N times as high as that in the case of converting video data with a standard frame rate of the same resolution into IP packets, and the mounting difficulty of the video transmission device is large. Similarly, since the conventional video reception device directly processes video data with a high frame rate, the mounting difficulty of the video reception device is large.

Further, since the video data with a high frame rate is transmitted as one IP flow, waiting delay time increases. Since a waiting delay time of $(N-1)/f_H$ is required to continue transmission of IP packets at a fixed bit rate, a delay time of about 8 milliseconds occurs between video frames in the case of 4K/120 FPS video data.

The present invention has been made in view of the above circumstances, and an object of the present invention is to provide a technology that facilitates mounting of a video transmission device and a video reception device and eliminates the occurrence of a waiting delay time.

Solution to Problem

A video transmission device according to one aspect of the present invention includes a plurality of transmission units that each convert into IP packets in parallel each video data with a low frame rate obtained by dividing video data with a high frame rate through allocation in units of vide frames in temporally preceding order and transmit the IP packets.

A video reception device according to one aspect of the present invention includes a plurality of reception units that receive IP packets of each video data with a low frame rate obtained by dividing video data with a high frame rate through allocation in units of video frames in temporally preceding order and convert the IP packets into the video data with the low frame rate in parallel.

A video transmission method according to one aspect of the present invention is a video transmission method performed by a video transmission device, the method including a step of causing each of a plurality of transmission units to convert into IP packets in parallel each video data with a low frame rate obtained by dividing video data with a high frame rate through allocation in units of video frames in temporally preceding order and transmit the IP packets.

A video reception method according to one aspect of the present invention is a video reception method performed by a video reception device, the method including a step of causing a plurality of reception units to receive IP packets of each video data with a low frame rate obtained by dividing video data with a high frame rate through allocation in units of video frames in temporally preceding order and convert the IP packets into the video data with the low frame rate in parallel.

A video transmission program according to one aspect causes a computer to function as the video transmission device described above.

A video reception program according to one aspect causes a computer to function as the video reception device described above.

Advantageous Effects of Invention

According to the present invention, it is possible to provide a technique capable of facilitating mounting of the video transmission device and the video reception device and eliminating the occurrence of a waiting delay time.

DESCRIPTION OF EMBODIMENTS

Embodiments of the present invention will be described below with reference to the drawings. In the description provided with reference to the drawings, the same parts are denoted by the same reference numerals and the description thereof is omitted.

Overview of Invention

The present invention relates to a video transmission device that converts video data with a high frame rate input using SDI into an IP flow and transmits the IP flow, a video reception device that receives video data for converting the video data with the high frame rate into SDI by receiving the IP flow, and a parallel transmission control device that controls parallel transmission of IP flows between the video transmission device and the video reception device.

In order to solve the above issue, the present invention parallelizes transmission units that process video data with a standard frame rate. Thus, even if only the transmission units supporting a standard frame rate are used, the processing of video data with a high frame rate is executed, the mounting of the video transmission device and the video reception device is facilitated, and the occurrence of the waiting delay time is eliminated.

Further, when seamless protection is executed, there is a further issue that the band consumption of the IP network increases. In a case where 4K/120 FPS video data is transmitted, its band consumption is 21 Gbps, but when seamless protection is applied for high reliability, a bandwidth of 42 Gbps, which is twice that bandwidth, is required.

Therefore, in order to solve the above-mentioned further issue, the present invention provides priority to video data with a standard frame rate, and applies execution of seamless protection from video data having high priority within the range of an available bandwidth. Thus, high reliability of transmission can be realized by effectively utilizing the available bandwidth.

Two embodiments will be described.

First Embodiment

[Configuration of Video Transmission System]

Figure 1:
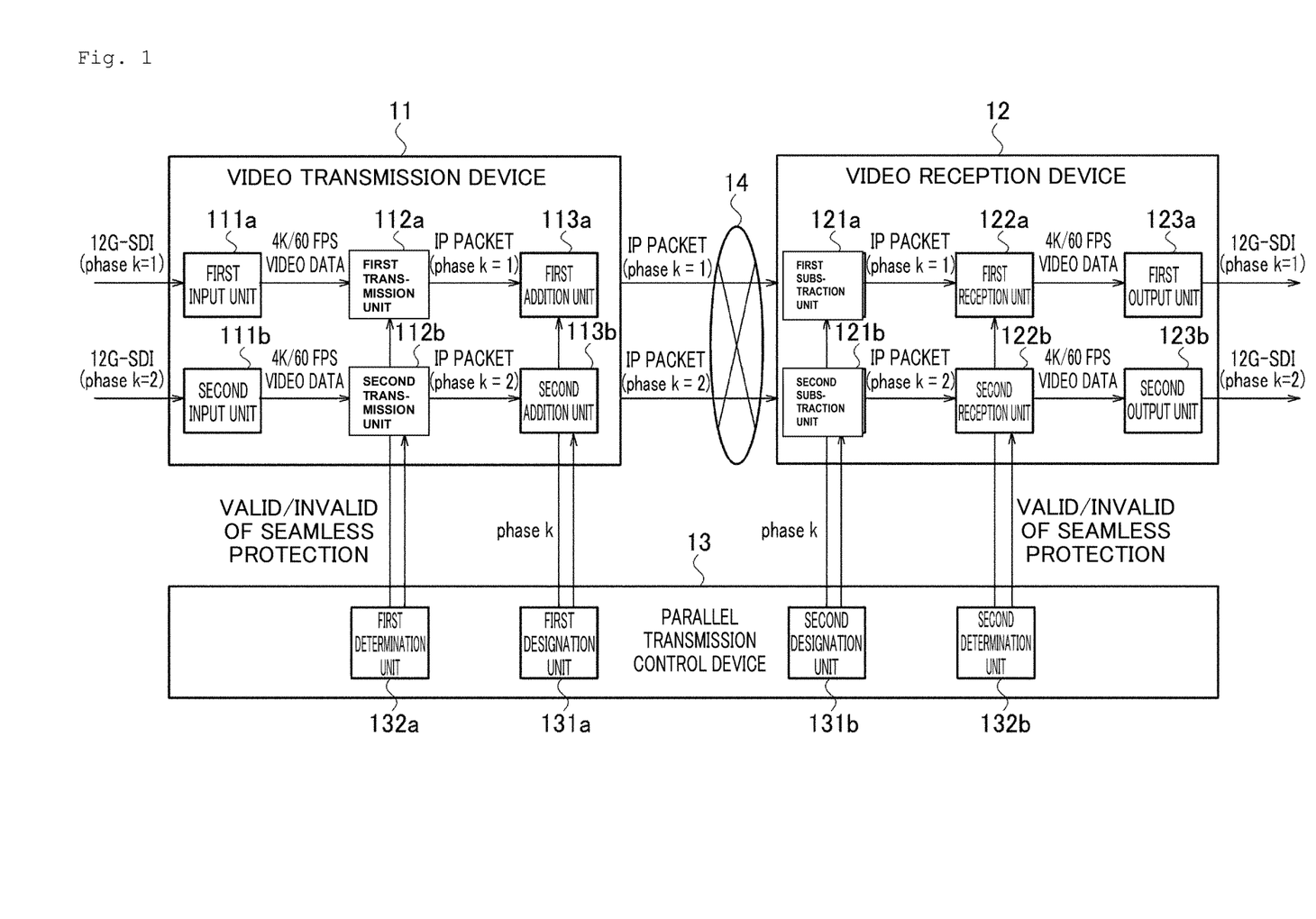
FIG. 1 is a diagram illustrating an overall configuration of a video transmission system according to a first embodiment.

FIG. 1 is a diagram illustrating an overall configuration of a video transmission system 1 according to a first embodiment. The video transmission system 1 includes a video transmission device 11 supporting 4K/120 FPS, a video reception device 12 supporting 4K/120 FPS, and a parallel transmission control device 13 that controls parallel transmission of IP flows between the video transmission device 11 and the video reception device 12.

Each of the devices 11, 12, and 13 is connected via an IP network 14 to be able to communicate with each other. The video transmission device 11 and the video reception device 12 need not necessarily be mounted as a single hardware unit.

[Function of Video Transmission Device]

Figure 2:
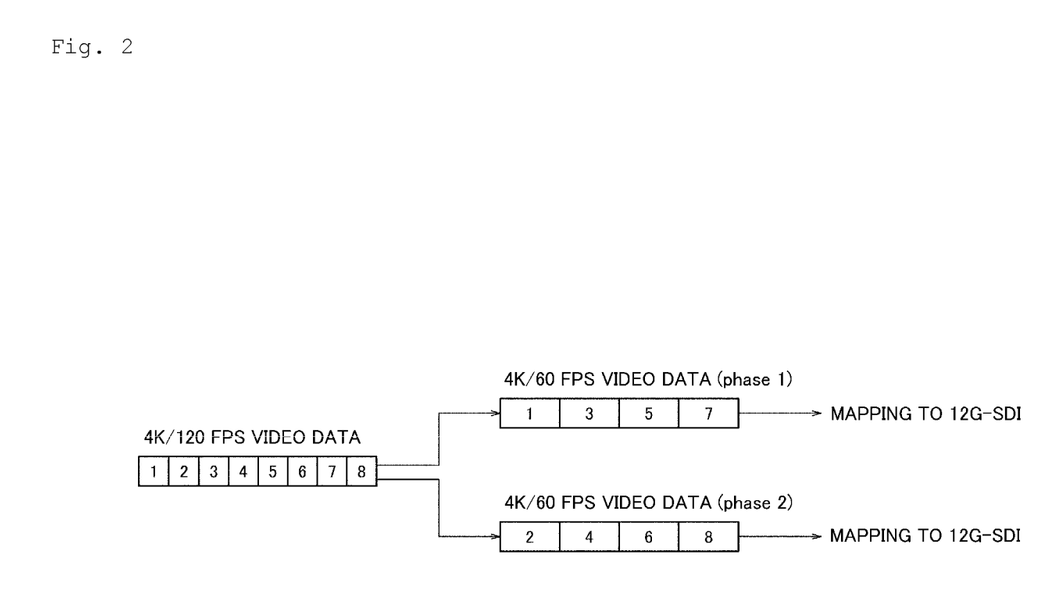
FIG. 2 is a diagram illustrating an example of phase division.

The video transmission device 11 is a device that converts 4K/120 FPS video data input via two synchronized 12G-SDI lines into two IP flows and transmits the data. The 4K/120 FPS video data is phase-divided into 4K/60 FPS video data of a phase 1 and 4K/60 FPS video data of a phase 2 as illustrated in FIG. 2, and each data is mapped to 12G-SDI and input to the video transmission device 11. The video transmission device 11 transmits an IP flow for each phase in accordance with Non Patent Literature 4 (RP2110-23).

Phase division is a method of dividing video data with a high frame rate into a plurality of pieces of video data of a standard frame rate by allocating the video data with the high frame rate in units of video frames in temporally preceding order. In this embodiment, the 4K/120 FPS video data is set as video data with a high frame rate, and the 4K/60 FPS video data is set as video data with a standard frame rate. The standard frame rate is an example of a low frame rate having a smaller number of frames than a high frame rate.

As illustrated in FIG. 1, the video transmission device 11 includes, for example, a first input unit 111a and a second input unit 111b that input an SDI signal, a first transmission unit 112a and a second transmission unit 112b compliant with ST2110 and supporting 4K/60 FPS, and a first addition unit 113a and a second addition unit 113b that add time stamps.

The first input unit 111a has a function for inputting one SDI signal out of two synchronized 12G-SDI lines and extracting 4K/60 FPS video data of the phase 1 from the SDI signal. The second input unit 111b has a function for inputting the other SDI signal and extracting 4K/60 FPS video data of the phase 2 from the SDI signal. The first input unit 111a and the second input unit 111b mutually execute processing in parallel.

The first transmission unit 112a has a function of storing 4K/60 FPS video data of the phase 1 in IP packets. The second transmission unit 112b has a function of storing 4K/60 FPS video data of the phase 2 in IP packets. The first transmission unit 112a and the second transmission unit 112b mutually execute processing in parallel.

The first addition unit 113a and the second addition unit 113b have a function for adding, to the RTP time stamp of the RTP packet of each IP packet, an offset $\Delta_k=(k-1)\times F/f_H$ corresponding to a phase k (k=1, 2) labeled to the video data of each 4K/60 FPS video data in the division order of the 4K/120 FPS video data. F is a clock frequency of the RTP time stamp in RTP packets of a video, and $F=9.0\times10^4$. The $f_H$ is a frame rate of 4K/120 FPS video data, and $f_H=120$. The first addition unit 113a and the second addition unit 113b mutually execute processing in parallel.

[Function of Video Reception Device]

The video reception device 12 receives two IP flows transmitted from the video transmission device 11 via the IP network 14, maps the IP flows to two synchronized 12G-SDI lines and outputs them.

For example, as illustrated in FIG. 1, the video reception device 12 includes a first subtraction unit 121a and a second subtraction unit 121b that subtract a time stamp, a first reception unit 122a and a second reception unit 122b that are compliant with ST2110 and support 4K/60 FPS, and a first output unit 123a and a second output unit 123b that output an SDI signal.

The first subtraction unit 121a has a function of receiving an IP packet of 4K/60 FPS video data of the phase 1 and subtracting the offset from the RTP time stamp of the RTP packet of the IP packet. The second subtraction unit 121b has a function of receiving an IP packet of 4K/60 FPS video data of the phase 2 and subtracting the offset from the RTP time stamp of the RTP packet of the IP packet. The first subtraction unit 121a and the second subtraction unit 121b mutually execute processing in parallel.

The first reception unit 122a has a function for extracting 4K/60 FPS video data of the phase 1 from an IP packet of 4K/60 FPS video data of the phase 1 after offset subtraction. The second reception unit 122b has a function for extracting 4K/60 FPS video data of the phase 2 from an IP packet of 4K/60 FPS video data of the phase 2 after offset subtraction. The first reception unit 122a and the second reception unit 122b mutually execute processing in parallel.

The first output unit 123a has a function of mapping 4K/60 FPS video data of the phase 1 to 12G-SDI and outputting an SDI signal. The second output unit 123b has a function of mapping 4K/60 FPS video data of the phase 2 to 12G-SDI and outputting an SDI signal. The first output unit 123a and the second output unit 123b mutually execute processing in parallel.

[Functional of Parallel Transmission Control Device]

The parallel transmission control device 13 is a device that controls the parallel transmission of the IP flows between the video transmission device 11 and the video reception device 12.

For example, as illustrated in FIG. 1, the parallel transmission control device 13 includes a first designation unit 131a and a second designation unit 131b that designate the number (k value) of the phase k, and a first determination unit 132a and a second determination unit 132b that determine to enable or disable the seamless protection.

The first designation unit 131a has a function for designating a k value of a phase k of video data to be processed by each addition unit, for the first addition unit 113a and the second addition unit 113b of the video transmission device 11. The second designation unit 131b has a function for designating a k value of a phase k of the video data to be processed by each subtraction unit, for the first subtraction unit 121a and the second subtraction unit 121b of the video reception device 12.

The first determination unit 132a has a function for determining to enable or disable the seamless protection on the basis of the priority of the phase, for the first transmission unit 112a and the second transmission unit 112b of the video transmission device 11. The second determination unit 132b has a function for determining to enable or disable the seamless protection on the basis of the priority of the phase, for the first reception unit 122a and the second reception unit 122b of the video reception device 12.

[Reason for Adding Offset]

The reason why the offset is added will now be described.

Non Patent Literature 4 (RP2110-23) defines a method of transmitting phase-divided video data with a high frame rate using a separate IP flow for each phase. In a case where the video data with a high frame rate is transmitted using a plurality of IP flows in accordance with Non Patent Literature 4, it is necessary to add an offset $\Delta_k=(k-1)\times F/f_H$ to the RTP time stamp of the standard frame rate, with respect to the RTP time stamp of the IP packets storing the video data of the phase k (1≤k≤N. N is a natural number of 2 or more). In the case of a 4K/120 FPS video, since F=9.0×10⁴, and $f_H$=120, the followings are established: $\Delta_1$=0, $\Delta_2$= 750, . . . .

However, generally, since transmission units (the first transmission unit 112a and the second transmission unit 112b) compliant with ST2110 and supporting a standard frame rate do not know the phase of the video to be processed, the same RTP time stamp is stamped regardless of the phase of the video data.

In order to make the RTP time stamps compliant with Non Patent Literature 4, the first addition unit 113a and the second addition unit 113b add, to the same RTP time stamps, an offset $\Delta_k$=(k−1)×F/$f_H$ according to the phase k of the video data to be processed.

[Operation of Video Transmission Device]

Figure 3:
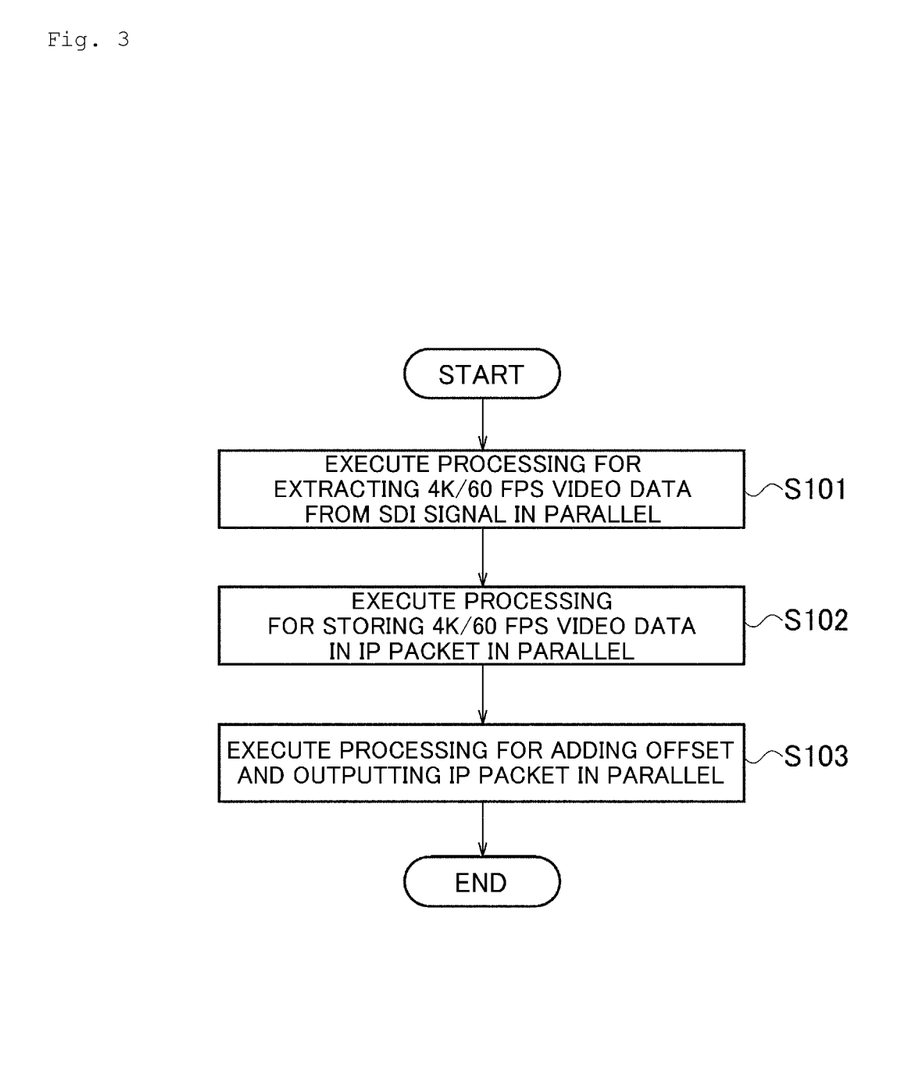
FIG. 3 is a diagram illustrating a processing flow of a video transmission device.

FIG. 3 is a diagram illustrating a processing flow of the video transmission device 11. The video transmission device 11 processes 4K/120 FPS video data by parallelizing the first transmission unit 112a and the second transmission unit 112b compliant with ST2110 and supporting 4K/60 FPS.

Step S101;

First, the first input unit 111a inputs one SDI signal of two synchronized 12G-SDI lines, extracts 4K/60 FPS video data of the phase 1 from the SDI signal, and passes the video data to the first transmission unit 112a. At the same time, the second input unit 111b inputs the other SDI signal, extracts 4K/60 FPS video data of the phase 2 from the SDI signal, and passes the data to the second transmission unit 112b.

Step S102;

Next, the first transmission unit 112a stores the 4K/60 FPS video data of the phase 1 in IP packets in accordance with ST2110. At the same time, the second transmission unit 112b stores 4K/60 FPS video data of the phase 2 in IP packets in accordance with ST2110.

Step S103;

Finally, the first transmission unit 112a transmits the IP packets of 4K/60 FPS video data of the phase 1 to the video reception device 12 via the IP network 14. At the same time, the second transmission unit 112b transmits the IP packets of 4K/60 FPS video data of the phase 2 to the video reception device 12 via the IP network 14.

At this time, the first transmission unit 112a and the second transmission unit 112b are designated by the parallel transmission control device 13 whether the seamless protection is enabled or not. In a case where the seamless protection is valid, the first transmission unit 112a and the second transmission unit 112b duplicate the RTP packets of the video data to transmit the video data using two IP flows, and in a case where the seamless protection is invalid, the first transmission unit 112a and the second transmission unit 112b transmit the video data using one IP flow.

In addition, at this time, since the first addition unit 113a makes the RTP time stamp conform to Non Patent Literature 4, the first addition unit 113a adds an offset $\Delta_k$=(k−1)×F/$f_H$=0 corresponding to the phase k (k=1) to the RTP time stamp of the RTP packets of the IP packets of the phase 1. Similarly, the second addition unit 113b adds an offset $\Delta_k$=(k−1)×F/$f_H$=750 corresponding to the phase k (k=2) to the RTP time stamp of the RTP packets of the IP packets of the phase 2. The phase k is designated by the parallel transmission control device 13.

[Operation of Video Reception Device]

Figure 4:
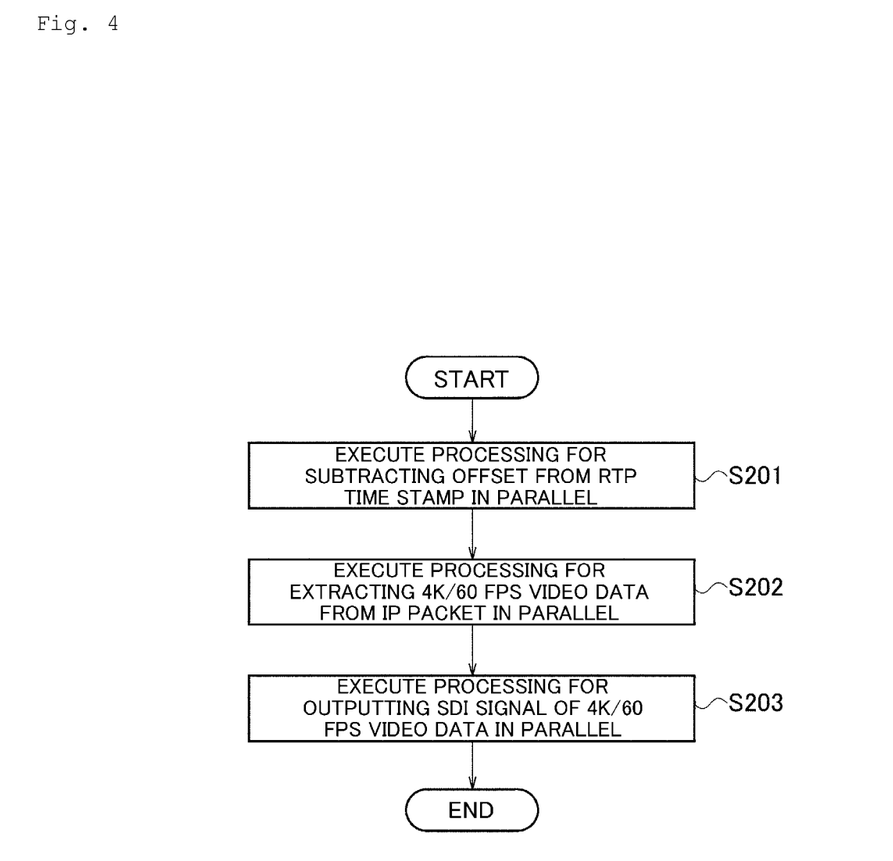
FIG. 4 is a diagram illustrating a processing flow of a video reception device.

FIG. 4 is a diagram illustrating a processing flow of the video reception device 12. The video reception device 12 processes the 4K/120 FPS video data by parallelizing the first reception unit 122a and the second reception unit 122b compliant with ST2110 and supporting 4K/60 FPS.

Step S201;

The RTP time stamp included in an IP packet received by the video reception device 12 is different for each phase due to addition of the offset performed in the step S103. However, since the RTP time stamp is used for controlling the video output timing, when the IP packet is passed to the first reception unit 122a and the second reception unit 122b as it is, the SDI signal is output at a timing different for each phase.

When the first subtraction unit 121a first receives an IP packet of 4K/60 FPS video data of the phase 1, the offset $\Delta_1$=0 corresponding to the phase k (k=1) is subtracted from the RTP time stamp of the RTP packet of the IP packet. At the same time, when the second subtraction unit 121b receives an IP packet of 4K/60 FPS video data of the phase 2, the offset $\Delta_2$=750 corresponding to the phase k (k=2) is subtracted from the RTP time stamp of the RTP packet of the IP packet. Thus, the RTP time stamps of all the phases are aligned. The phase k is designated by the parallel transmission control device 13.

Step S202;

Next, the first reception unit 122a extracts 4K/60 FPS video data of the phase 1 from an IP packet of 4K/60 FPS video data of the phase 1 after offset subtraction and passes the extracted data to the first output unit 123a. At the same time, the second reception unit 122b extracts 4K/60 FPS video data of the phase 2 from an IP packet of 4K/60 FPS video data of the phase 2 after offset subtraction and passes the extracted data to the second output unit 123b.

At this time, the first reception unit 122a and the second reception unit 122b are designated by the parallel transmission control device 13 whether the seamless protection is enabled or not. In a case where the seamless protection is valid, the first reception unit 122a and the second reception unit 122b integrate the received two IP flows and then extract 4K/60 FPS video data. For example, in a case where the video data of one IP flow is missing, it is complemented by the video data of the other IP flow. In a case where the seamless protection is invalid, the first reception unit 122a and the second reception unit 122b extract 4K/60 FPS video data from one received IP flow.

Step S203;

Finally, the first output unit 123a maps the 4K/60 FPS video data of the phase 1 to 12G-SDI and outputs the SDI signal. At the same time, the second output unit 123b maps the 4K/60 FPS video data of the phase 2 to 12G-SDI and outputs the SDI signal.

[Method for Determining Validity/Invalidity of Seamless Protection]

The parallel transmission control device 13 determines and designates whether seamless protection of the first transmission unit 112a and the second transmission unit 112b is enabled or not according to the priority of the phase. For example, the parallel transmission control device 13 preferentially applies seamless protection from the phase of a small number (k value) within a range not exceeding an available bandwidth. The first transmission unit 112a and the second transmission unit 112b of the video transmission device 11 duplicate and transmit the RTP packets of the video data with the standard frame rate of the phase in a case where the priority of the phase to be transmitted by each transmission unit is high.

When both the phase 1 and the phase 2 can be stably received, the 4K/120 FPS video data can be output. However, since the validity/invalidity of seamless protection is determined and designated according to the priority of the phase, 4K/60 FPS video data can be output if only the phase 1 can be received stably, and the worst situation where the output video is interrupted can be avoided.

Here, assuming that B is an available bandwidth and b is a bit rate of an IP flow per video data with a standard frame rate, the maximum value $k_{max}$ of the phase which can be protected by seamless protection can be defined as in Equation (1).

[Math. 1]

$$k_{max} = \left\lfloor \frac{B}{b} - N \right\rfloor \quad \text{Equation (1)}$$

A consumed bandwidth b in a case of transmitting the 4K/60 FPS video data with SMPTE ST2110 is b=10.5 Gbps. If the available bandwidth B is set to 40 Gbps, the seamless protection transmission of all packets consumes twice the bandwidth and thus cannot be applied. According to Equation (1), since $k_{max}=1$, only the phase 1 can be protected by the seamless protection, and the consumed bandwidth is 31.5 Gbps.

Second Embodiment

Figure 5:
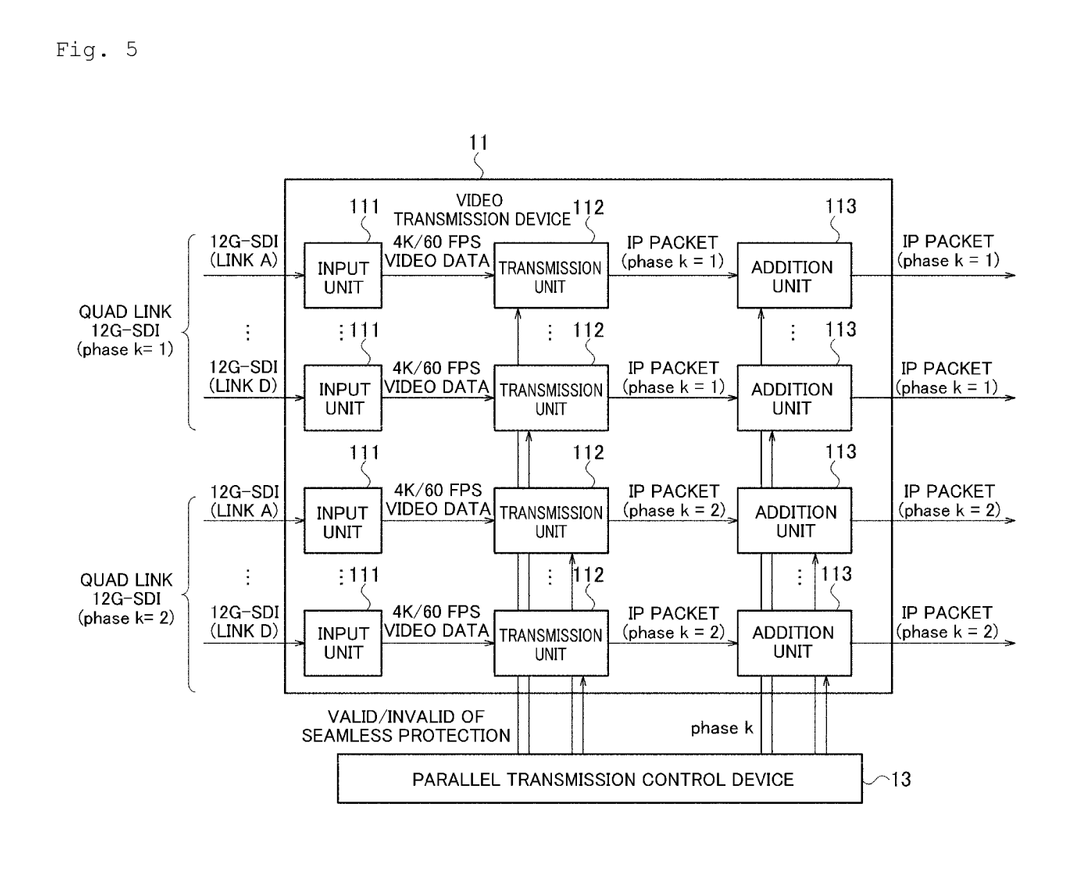
FIG. 5 is a diagram illustrating a configuration of the video transmission device according to a second embodiment.
Figure 6:
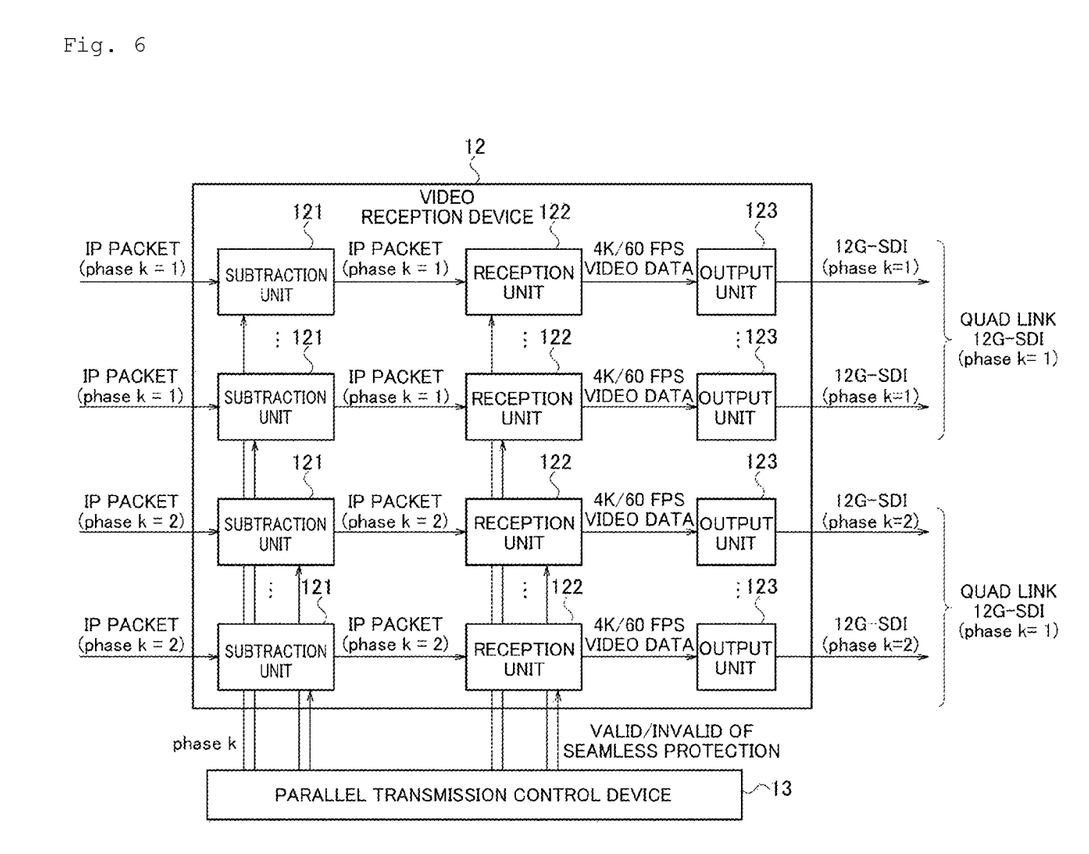
FIG. 6 is a diagram illustrating a configuration of the video reception device according to a second embodiment.

FIG. 5 is a diagram illustrating a configuration of the video transmission device 11 according to a second embodiment. FIG. 6 is a diagram illustrating a configuration of the video transmission device 12 according to the second embodiment.

The video transmission device 11 converts 8K/120P video data input via synchronized two sets of 12G-SDI quad links into eight IP flows of ST2110 for each link of 12G-SDI in accordance with RP2110-23, and transmits them. The video reception device 12 receives these eight IP flows, maps them to synchronized two sets of 12G-SDI quad links and outputs them.

The video transmission device 11 according to the present embodiment processes 8K/120P video data by arranging in parallel eight transmission units 112 which are compliant with ST2110 and support 4K/60 FPS. Eight input units 111 extract 4K/60 FPS video data from the respective SDI signals and pass them to the transmission units 112.

The video reception device 12 according to the present embodiment processes 8K/120P video data by arranging in parallel eight reception units 122, which are compliant with ST2110 and support 4K/60 FPS. Eight reception units 122 extract 4K/60 FPS video data from the respective IP flows and pass them to an output unit 123.

The parallel transmission control device 13 according to the present embodiment designates whether the seamless protection of each transmission unit 112 is enabled in accordance with the communication quality of the IP network 14. The seamless protection is preferentially applied from the transmission unit 112 and the reception unit 122 corresponding to an IP flow with poor communication quality within a range not exceeding an available band. In a case where the communication quality of the IP network 14 is low, each transmission unit 112 of the video transmission device 11 duplicates and transmits the RTP packets of video data with a standard frame rate to be transmitted by each transmission unit.

Figure 7:
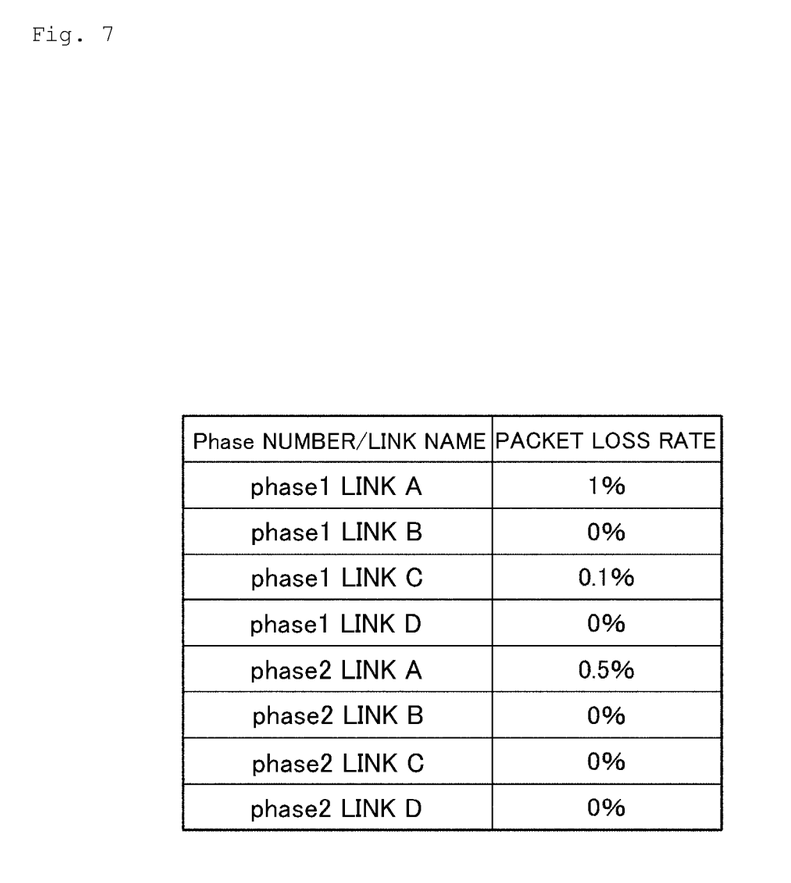
FIG. 7 is a diagram illustrating an example of a packet loss rate for each phase number/link.

The communication quality may be determined by using a packet loss rate in the reception unit 122 as a criterion. The consumed bandwidth in the case of 8K/120 FPS video data is 84 Gbps. When the available bandwidth is 100 Gbps, one IP flow of 4K/60 FPS can be added. For example, in a case where a packet loss rate as illustrated in FIG. 7 is observed, the seamless protection is enabled in the transmission unit 112 and the reception unit 122 corresponding to the link A of the phase 1 having the highest packet loss rate. At this time, the consumed bandwidth is 94.5 Gbps.

[Effects]

Figure 8:
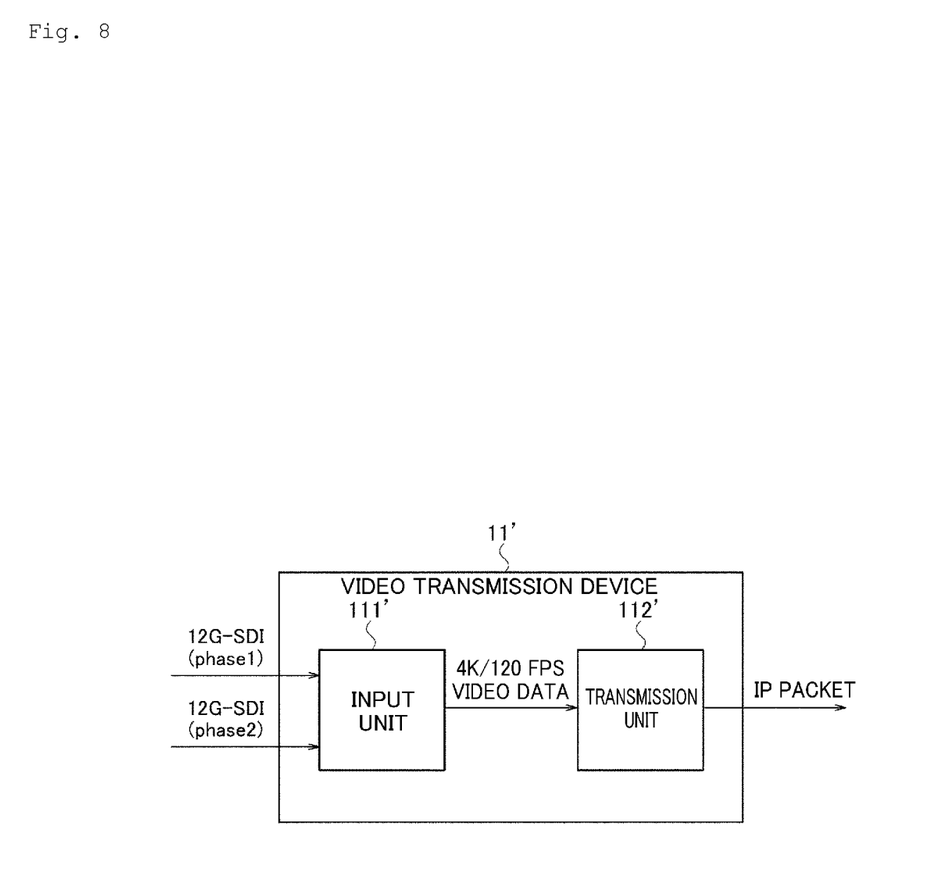
FIG. 8 is a diagram illustrating a configuration of a conventional video transmission device.

FIG. 8 illustrates the configuration of a conventional video transmission device 11' supporting 4K/120 FPS. The conventional video transmission device 11' transmits 4K/120 FPS video data input via two parallel 12G-SDI lines, in accordance with ST2110. One input unit 111' extracts 4K/60 FPS video data from each 12G-SDI, and alternately passes the video frame (4K/60 FPS video data) of the phase 1 and the video frame (4K/60 FPS video data) of the phase 2 to a transmission unit 112'. The transmission unit 112' stores the video data passed from the input unit 111' in RTP packets in order, and transmits the 4K/120 FPS video data as one IP flow.

As compared with the video transmission device 11 according to each of the embodiments illustrated in FIGS. 1 and 5, there is only one transmission unit 112', and one transmission unit 112' converts the video data of 4K/120 FPS into IP packets. Therefore, as described above, as compared with the case of converting the video data with the standard frame rate of the same resolution into IP packets, N times faster processing is required, and the mounting difficulty of the video transmission device is large.

Figure 9:
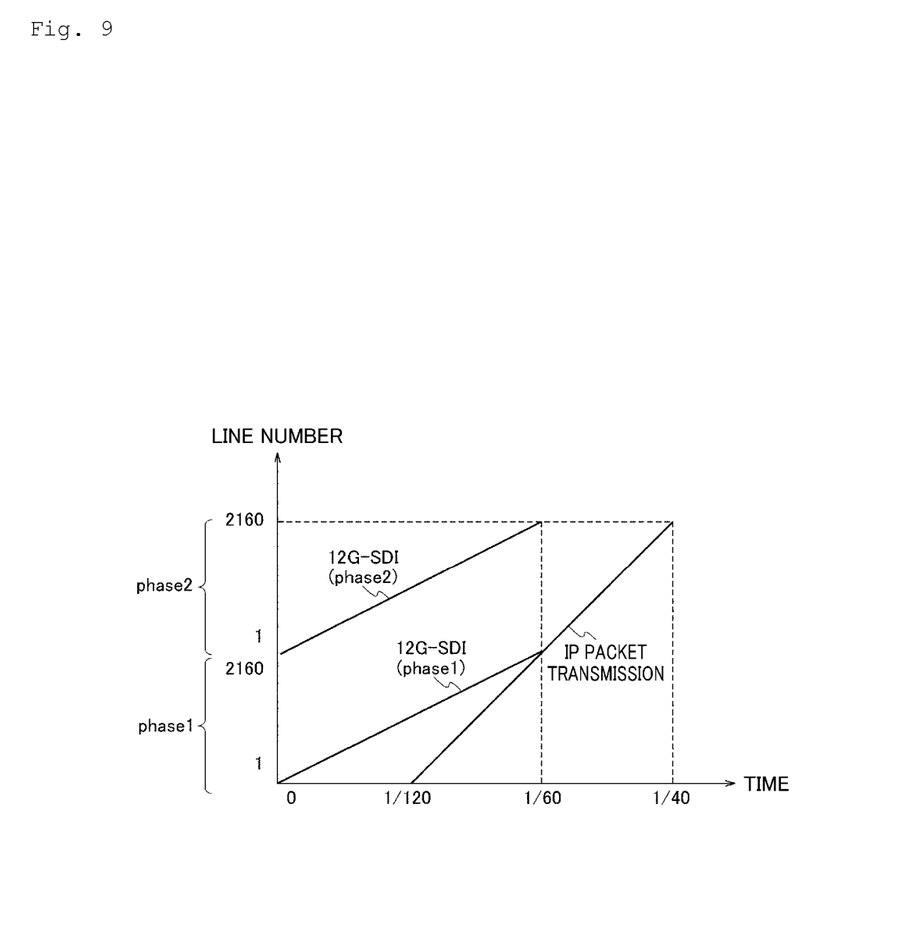
FIG. 9 is a diagram illustrating a waiting delay time of the conventional video transmission device.

Further, as illustrated in FIG. 9, since the waiting delay time of $(N-1)/f_H$ is required to continue the transmission of IP packets at a constant bit rate, a delay time of about 8 milliseconds occurs between video frames in the case of 4K/120 FPS video data.

[First Effect]

On the other hand, in the first embodiment and the second embodiment, the video transmission device 11 includes a plurality of transmission units 112 that each convert video data with a standard frame rate obtained by phase-dividing video data with a high frame rate into IP packets in parallel and transmit the IP packets.

In addition, in the first embodiment and the second embodiment, the video reception device 12 includes a plurality of reception units 122 that receive IP packets of each video data with a standard frame rate obtained by phase-dividing video data with a high frame rate and convert the IP packets into video data with a low frame rate in parallel.

In this way, since with a configuration that processes the video data with the high frame rate by parallelizing the transmission unit 112 and the reception unit 122 supporting the standard frame rate, the throughput required in the transmission unit 112 and the reception unit 122 can be reduced compared to the conventional method of directly processing the video data with a high frame rate, and thus mounting of the video transmission device 11 and the video reception device 12 becomes easy and occurrence of a waiting delay time can be eliminated.

Further, by increasing the number of parallels, scalability is provided which can cope with a higher frame rate. Since the video transmission device 11 and the video reception device 12 do not necessarily need to be mounted as a single piece of hardware, for example, by using two video transmission devices 11 of the first embodiment and arranging four transmission units 112 supporting 4K/60 FPS in parallel, 4K/240 FPS can be supported. A configuration such as using in parallel two video transmission device 11 supporting 8K/60 FPS equipped with four transmission units 112 supporting 4K/60 FPS is also possible. The number of each of the video transmission device 11, the input unit 111, the transmission unit 112, the addition unit 113, the video reception device 12, the subtraction unit 121, the reception unit 122, and the output unit 123 can be optionally changed according to image resolution such as 4K and 8K and the frame rate such as 60 FPS.

Furthermore, efficient development is enabled by utilizing design resources of existing video transmission units and video reception units supporting a standard frame rate.

[Second Effect]

In addition, in the first embodiment and the second embodiment, the video transmission device 11 includes a plurality of addition units 113 that add, to the RTP time stamp of the RTP packet of each IP packet, an offset (offset $\Delta_k=(k-1)\times F/f_H$ according to the phase k ($1 \le k \le N$) of the video data with the standard frame rate) that increases by a constant in accordance with the number attached to each video data with the standard frame rate in the order of division of the video data with the high frame rate.

In addition, in the first embodiment and the second embodiment, the video reception device 12 includes a plurality of subtraction units 121 that subtract, from the RTP time stamp of the RTP packet of each IP packet, an offset (offset $\Delta_k=(k-1)\times F/f_H$ according to the phase k ($1 \le k \le N$) of the video data with the standard frame rate) that increases by a constant in accordance with the number attached to each video data with the standard frame rate in the order of division of the video data with the high frame rate.

As described above, since the video transmission unit supporting the standard frame rate does not concern the phase, the RTP time stamp which does not conform to the PR2110-23 is stamped. On the other hand, in each embodiment, since the addition unit 113 converts the RTP time stamp into the RTP time stamp based on the RP2110-23, the interconnection property can be secured.

In an IP flow based on the RP2110-23, since RTP time stamps different between phases are stamped, there is a possibility that output timing from the video reception unit supporting the standard frame rate is deviated. On the other hand, in each embodiment, since the subtraction unit 121 aligns the time stamps of all the phases, it is possible to align the output timings from the video reception units supporting the standard frame rate.

Although a waiting delay time is required when high frame rate video data is transmitted via one IP flow, the delay can be reduced by performing a time stamp operation without waiting for video data in each embodiment.

[Third Effect]

In addition, in the first embodiment and the second embodiment, the parallel transmission control device 13 includes a determination unit 132 that automatically determines whether redundant transmission is enabled or not for each of the transmission units 112 of the video transmission device 11 and the reception units 122 of the video reception device 12 which are arranged in parallel, based on the priority of the phase or the communication quality of the IP network 14.

In addition, in the first embodiment and the second embodiment, in a case where the priority of the video data of the standard frame rate to be transmitted is high, or in a case where the communication quality of the IP network 14 connected to the video transmission device 11 is low, the RTP packet of the video data of the standard frame rate is duplicated and transmitted by the plurality of the transmission units 112 of the video transmission device 11.

In this manner, since the seamless protection is controlled with fine granularity utilizing the fact that high frame rate video data is divided into a plurality of pieces of video data with a standard frame rate and transmitted, high reliability of transmission utilizing an available band effectively can be achieved.

[Others]

The present invention is not limited to the embodiments described above. The present invention can be modified in a number of ways within the scope of the gist of the present invention.

Figure 10:
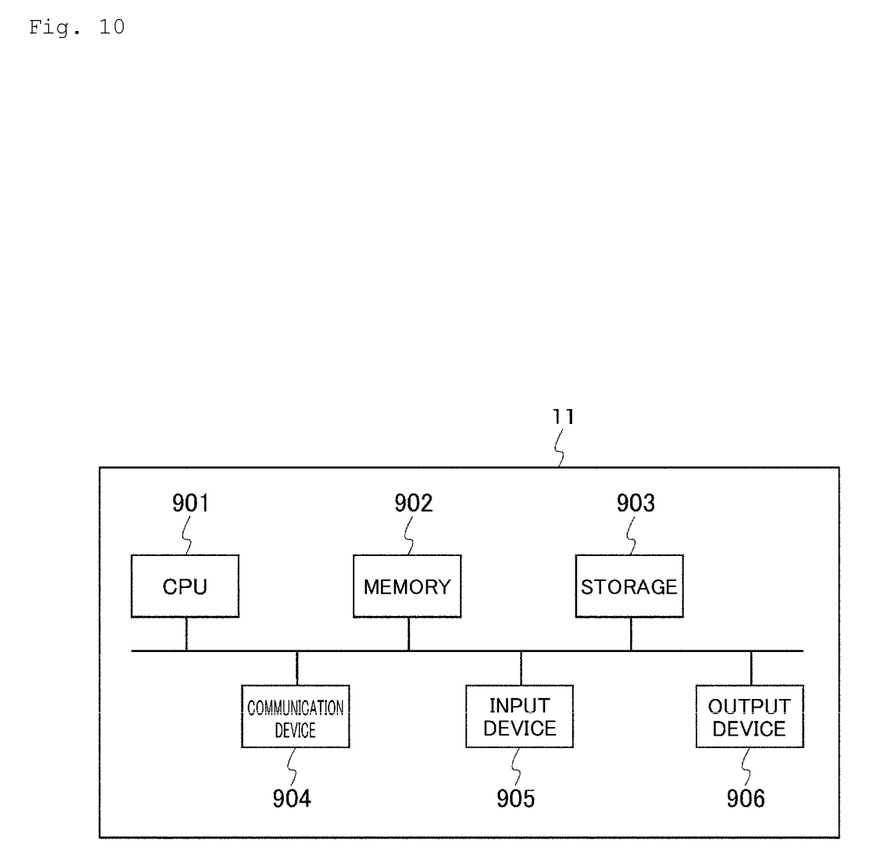
FIG. 10 is a diagram illustrating an example of a hardware configuration of the video transmission device.

The video transmission device 11 of the present embodiment described above can be realized using, for example, a computer system including a CPU 901, a memory 902, a storage 903, a communication device 904, an input device 905, and an output device 906 as illustrated in FIG. 10. The memory 902 and the storage 903 are storage devices. In the computer system, each function of the video transmission device 11 is realized by the CPU 901 executing a predetermined program loaded on the memory 902.

A program for the video transmission device 11 can be stored in a computer-readable recording medium such as an HDD, an SSD, a USB memory, a CD, or a DVD. The program for the video transmission device 11 can also be distributed via a communication network.

The video reception device 12 also has a hardware configuration similar to that illustrated in FIG. 10.

REFERENCE SIGNS LIST

1 Video transmission system
11 Video transmission device
111 Input unit
112 Transmission unit
113 Addition unit
12 Video reception device
121 Subtraction unit
122 Reception unit
123 Output unit
13 Parallel transmission control device
131 Designation unit
132 Determination unit

The invention claimed is:

1. A video transmission device comprising:
a plurality of transmission units, including one or more processors, configured to each convert into IP packets in parallel synchronized multiple video data with a low frame rate obtained by dividing video data with a high frame rate through allocation in units of video frames in temporally preceding order and transmit the IP packets; and
a plurality of addition units, each comprising one or more processors and configured to add, to a Real-time Transport Protocol (RTP) time stamp of an RTP packet included in each of the IP packets, a time offset that increases by a constant value based on a division order identifier assigned to the respective video data having the low frame rate, the division order identifier is an integer indicating an order in which the video data having the high frame rate was divided.

2. The video transmission device according to claim 1, wherein the plurality of transmission units,
in a case where a priority of the video data with the low frame rate to be transmitted is high or communication quality of an IP network connected to the video transmission device is low, each duplicate and transmit RTP packets of the video data with the low frame rate.

3. The video transmission device according to claim 1, wherein the addition units are separate from the transmission units.

4. The video transmission device according to claim 1, wherein time offset $\Delta_k$ is computed as $\Delta_k=(k-1)\times F/f_H$, wherein k is the division order identifier associated with the video data having the low frame rate, F is a clock frequency of the RTP time stamp, and $f_H$ is the high frame rate.

5. A non-transitory computer-readable storage medium storing video transmission program that causes a computer to function as the video transmission device according to claim 1.

6. A video reception device comprising:
   a plurality of subtraction units, including one or more processors, configured to:
      subtract a respective offset from a time stamp of each of a plurality of received IP packets of synchronized multiple video data with a low frame rate obtained by dividing video data with a high frame rate through allocation in units of video frames in a temporally preceding order, wherein each IP packet includes an RTP time stamp, to which a respective time offset has been added, the respective time offset increasing by a constant value based on a division order identifier assigned to the respective video data having the low frame rate, the division order identifier is an integer indicating an order in which the video data having the high frame rate was divided; and
      convert the IP packets into the video data with the low frame rate in parallel.

7. A non-transitory computer-readable storage medium storing video reception program that causes a computer to function as the video reception device according to claim 6.

8. A video transmission method performed by a video transmission device, the method comprising:
   causing each of a plurality of transmission units to convert into IP packets in parallel synchronized multiple video data with a low frame rate obtained by dividing video data with a high frame rate through allocation in units of video frames in temporally preceding order and transmit the IP packets; and
   causing each of a plurality of addition units to add, to a Real-time Transport Protocol (RTP) time stamp of an RTP packet included in each of the IP packets, a time offset that increases by a constant value based on a division order identifier assigned to the respective video data having the low frame rate, the division order identifier is an integer indicating an order in which the video data having the high frame rate was divided.

* * * * *